No. 774,994. Patented November 15, 1904.

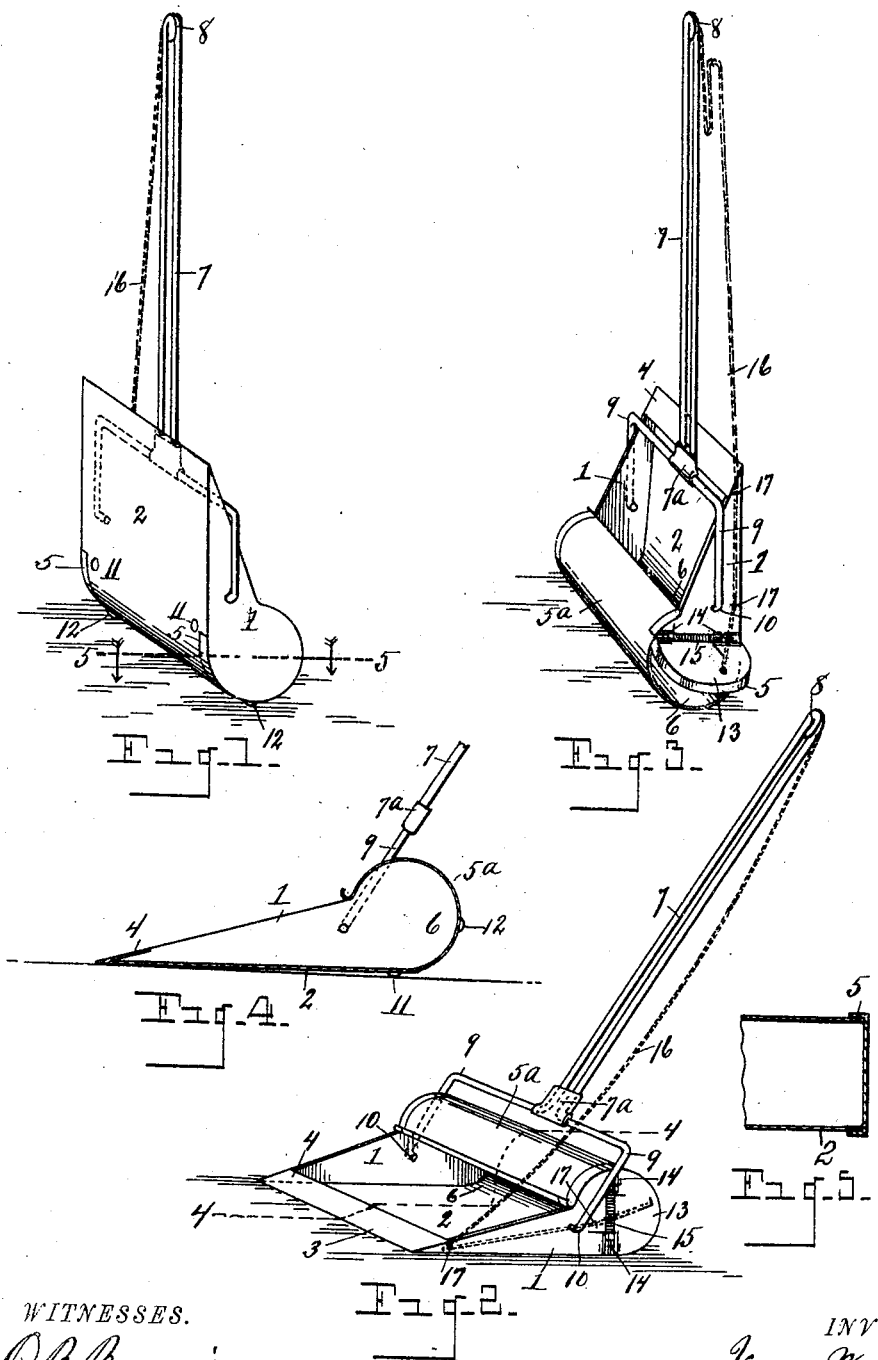

UNITED STATES PATENT OFFICE.

JAMES W. SNEDEKER, OF ADRIAN, MICHIGAN, ASSIGNOR TO JOHN W. PAGE, OF ADRIAN, MICHIGAN.

DUST-PAN.

SPECIFICATION forming part of Letters Patent No. 774,994, dated November 15, 1904.

Application filed February 17, 1902. Serial No. 94,406. (No model.)

*To all whom it may concern:*

Be it known that I, JAMES W. SNEDEKER, a citizen of the United States, residing at Adrian, in the county of Lenawee, State of Michigan, have invented certain new and useful Improvements in Dust-Pans; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to dust-pans; and it consists in the construction and arrangement of parts hereinafter fully set forth, and pointed out particularly in the claims.

The objects of the invention are to provide a dust-pan of comparatively simple and inexpensive construction having a dust-pocket so arranged as to receive and retain the dirt and said pan being so mounted upon the handle as to cause it to automatically assume a position to receive the dirt when placed upon the floor and automatically discharge the dirt into the dust-pocket when raised from the floor.

A further object is to provide a door to enable the dust to be readily discharged from the dust-pocket and to provide at the forward edge of the pan an inclined shoulder which prevents the escape of dust from the pan and serves as a truss to obviate the warping of the pan at its front edge.

A further object is to provide rubber cushions or knobs so positioned as to prevent the pan from making a noise when placed upon the floor and to hold the pan against sliding when dust and dirt is being swept therein.

The above objects are attained by the association and combination of parts illustrated in the accompanying drawings, in which—

Figure 1 is a perspective view showing the initial position of the pan when being placed upon the floor for use. Fig. 2 is a perspective view showing the final position of the pan ready to receive the dust and dirt. Fig. 3 is a perspective view with the pan in the same position shown in Fig. 1, but looking into the opening therein. Fig. 4 is a transverse section on line 4 4, Fig. 2. Fig. 5 is a sectional view through the dust-pocket of the pan on line 5 5 of Fig. 1.

Referring to the characters of reference, 1 designates the sides of the pan, which are formed of any suitable material and which at their forward ends describe an acute angle, the rear ends of said side pieces being rounded or circular, as shown. The material forming the bottom 2 of the pan is preferably of sheet metal, which at the forward or front edge of the pan is folded upon itself, as at 3, the free edge of the metal projecting rearwardly and extending onto the upper inclined edge of the sides, whereby said turned edge is raised above the bottom of the pan and forms a shoulder 4, which prevents the dust from dragging out of the pan by contact with the broom when once it has been swept therein. Said folded portion also serves as a transverse truss across the front edge of the pan, which prevents warping or twisting thereof and insures a close contact at the edge of the pan with the floor, enabling dust or dirt to be readily swept into the pan over said inclined shoulder.

The side pieces 1, which are preferably formed of metal, are provided around their circular rear portion with a laterally-projecting flange 5, as shown more clearly in Fig. 5. The metal sheet of which the bottom 2 is formed extends rearwardly and is bent around the circular rear ends of the sides 1, as at $5^a$, the rear margin of the sheet terminating at the junction of the round portion, with the inclined upper edge of said sides forming a dust-pocket 6 at the rear of the pan, the flanges 5 at the ends of the rounded portion extending onto the metal sheet.

The handle 7, which is herein shown as formed of a continuous strand of wire of suitable gage provided with a coil 8 at the upper end, but which may be formed of any material in any suitable manner, is provided at its lower end with a bail 9, having inwardly-bent end portions 10, which are pivoted in the opposite sides of the pan. The point of pivoting the bail of the handle is so located as to cause the rear of the pan to swing downwardly because of its greater weight when the pan is raised by or supported through the medium of the handle, as shown in Figs. 1 and 3, the purpose of which is to cause any dust or dirt which may be in the pan to fall into the dust-pocket 6 as the pan is raised from the floor. A clip $7^a$ embraces and confines the wire-strands at the junction of the bail and handle.

When the pan is placed upon the floor for use, its rear rounded portion first engages the floor, as shown in Fig. 1, with its front edge in a vertical position. As the supporting stress upon the handle is relaxed the pan tips forwardly, rolling upon the rear rounded portion, and assumes the positions shown in Figs. 2 and 4, with its front edge in contact with the floor, in which position dirt and dust may readily be swept into the pan over the inclined shoulder 4. Upon the bottom of the pan near its rear are the rubber knobs 11, which serve to hold the pan in place and prevent it from moving about as the broom passes over the forward inclined portion in the operation of sweeping dirt therein, and upon the rear round portion of the pan are like knobs 12, so positioned as to first encounter the floor as the pan is placed thereon in the position shown in Fig. 1, thereby deadening the noise of contact between the pan and floor.

After the dirt has been swept into the pan it is raised from the floor by the handle, which operation causes it to assume the position shown in Figs. 1 and 3, when the dirt will fall into the dust-pocket 6. To provide for discharging the dirt from the dust-pocket, a door 13 is formed at the rear end of one of the side pieces, which describes a semicircle and is hinged at 14, so as to open outwardly. Said hinge is provided with a coiled spring 15, whose tension is exerted to normally hold the door closed. For the purpose of opening said door a cord or chain 16 may be attached thereto which passes through suitable leads 17 on the side of the pan and extends to the upper end of the handle. When desiring to discharge the dirt from the dust-pocket, the pan is raised by the handle and the door opened by the hand or by drawing upon the chain or cord 16, as shown in Fig. 3, when by tilting the pan the entire contents of the dust-pocket may be discharged through said door. Upon releasing the door the spring of the hinge will automatically close the door and maintain it in a closed position against accidental opening.

It will be understood that the dust-pan constructed as herein described will automatically assume a position to receive the dirt to be swept therein when placed upon the floor and when raised from the floor by the handle will automatically tilt to a vertical position to cause the dirt to fall into the dust-pocket, where it may be retained until the pan is again used or from which pocket it may be at any time discharged by opening the door 13.

Having thus fully set forth my invention, what I claim as new, and desire to secure by Letters Patent, is—

1. In a dust-pan, the combination of the flat bottom and vertical sides, the rear ends of the sides being circular in form and the material of the bottom being shaped to said circular ends forming a cylindrical dust-pocket extending transversely of the rear of the pan and normally open at its front side, the exterior of said cylindrical pocket being free from projections and adapted to roll upon the floor, a handle pivoted to the sides of the pan at a point to allow the dust-pocket to swing downwardly when the pan is raised by the handle, a door formed in the end of the dust-pocket and adapted to swing outwardly, means for normally holding said door closed, a chain attached to the free edge of said door and to the handle, said chain passing through a lead on the front of the pan.

2. A dust-pan having a pivoted handle a flat bottom and vertical sides, the rear ends of the sides being formed in the arc of a circle and the material of the bottom being bent around said circular portions of the sides to form at the rear of the pan and between the sides a cylindrical dust-pocket whose exterior surface is adapted to roll upon the floor, a door formed in the side of the pan at the rear, said door opening from the dust-pocket, a springhinge for normally maintaining said door closed, and a chain attached to said door and leading up said handle.

In testimony whereof I sign this specification in the presence of two witnesses.

JAMES W. SNEDEKER.

Witnesses:
F. E. OSGOOD,
GEO. R. BENNETT.